United States Patent
Tokuda et al.

(10) Patent No.: US 11,492,295 B2
(45) Date of Patent: Nov. 8, 2022

(54) METHOD FOR PRODUCING HONEYCOMB STRUCTURE

(71) Applicant: NGK INSULATORS, LTD., Nagoya (JP)

(72) Inventors: Shingo Tokuda, Nagoya (JP); Shuji Ueda, Nagoya (JP); Takayuki Kanetake, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 619 days.

(21) Appl. No.: 16/506,133

(22) Filed: Jul. 9, 2019

(65) Prior Publication Data

US 2020/0039891 A1 Feb. 6, 2020

(30) Foreign Application Priority Data

Aug. 2, 2018 (JP) .............................. JP2018-146110

(51) Int. Cl.
| | |
|---|---|
| C04B 38/00 | (2006.01) |
| C04B 35/195 | (2006.01) |
| C04B 35/80 | (2006.01) |
| C04B 40/00 | (2006.01) |
| C04B 35/622 | (2006.01) |

(Continued)

(52) U.S. Cl.
CPC ............ *C04B 38/0006* (2013.01); *B28B 3/20* (2013.01); *C04B 35/195* (2013.01); *C04B 35/80* (2013.01); *B28B 2003/203* (2013.01); *C04B 35/622* (2013.01); *C04B 35/64* (2013.01); *C04B 40/0028* (2013.01); *C04B 2235/3445* (2013.01); *C04B 2235/3481* (2013.01); *C04B 2235/5232* (2013.01); *C04B 2235/6021* (2013.01)

(58) Field of Classification Search
None
See application file for complete search history.

(56) References Cited

U.S. PATENT DOCUMENTS 5,488,021 A * 1/1996 DeLiso .................. B01J 20/20
502/413
2003/0151174 A1 8/2003 Makino et al.
2005/0221053 A1 10/2005 Tomita et al.
(Continued)

FOREIGN PATENT DOCUMENTS

JP 2002-292616 A1 10/2002
JP 2008-019111 A1 1/2008
(Continued)

OTHER PUBLICATIONS

Active Minerals Acti-Gel 208 product information (Year: 2007).*
(Continued)

*Primary Examiner* — David Sample
*Assistant Examiner* — Elizabeth Collister
(74) *Attorney, Agent, or Firm* — Burr & Brown, PLLC

(57) ABSTRACT

A method for producing a honeycomb structure, the method comprising the steps of: kneading a forming raw material containing a cordierite forming material and then forming it to produce a honeycomb formed body; and firing the honeycomb formed body to provide a honeycomb structure. In the producing method, from 0.1 to 6.0 parts by mass of a magnesium silicate mineral having a 2:1 ribbon type structure per 100 parts by mass of the cordierite forming material is added to the forming raw material.

3 Claims, 2 Drawing Sheets

(51) Int. Cl.
  *B28B 3/20* (2006.01)
  *C04B 35/64* (2006.01)

(56) References Cited

U.S. PATENT DOCUMENTS

| | | | |
|---|---|---|---|
| 2005/0266992 A1* | 12/2005 | Ohno | C04B 35/6263 502/439 |
| 2006/0030475 A1* | 2/2006 | Beall | C04B 35/6263 501/119 |
| 2006/0177629 A1* | 8/2006 | Kunieda | C04B 35/18 428/116 |
| 2008/0176028 A1* | 7/2008 | Ohno | C04B 35/117 428/116 |
| 2008/0241003 A1* | 10/2008 | Ido | F01N 3/2828 422/168 |
| 2009/0199953 A1* | 8/2009 | Sato | B28B 11/006 156/89.22 |
| 2011/0300335 A1* | 12/2011 | Clinton | B01D 46/2429 428/141 |
| 2012/0135186 A1* | 5/2012 | Beall | C04B 35/6365 428/116 |
| 2014/0113106 A1 | 4/2014 | Tomita et al. | |

FOREIGN PATENT DOCUMENTS

| | | |
|---|---|---|
| JP | 2009-542429 A1 | 12/2009 |
| JP | 4745963 B2 | 8/2011 |
| JP | 5001892 B2 | 8/2012 |
| JP | 5647051 B2 | 12/2014 |
| JP | 5658067 B2 | 1/2015 |
| WO | 2008/005337 A1 | 1/2008 |

OTHER PUBLICATIONS

Active Minerals, Acti-gel 208 Magnesium Aluminosilicate Powder product sheet, Resived Nov. 2014, p. 1 (Year: 2014).*

Properties of Clay Minerals, Clay Handbook, 2nd Edition, Japan, Gihodo Shuppan Co., Ltd., Apr. 30, 1987, pp. 14-15, pp. 85-90.

Attapulgite • Sepiolite, Knowledge and Trade of Mineral Products, 10th Edition, Japan, Research Institute of Economy, Trade and Industry, Mar. 7, 1992, pp. 771-773.

Japanese Office Action (Application No. 2018-146110) dated Mar. 23, 2021 (with English translation).

* cited by examiner

[FIG. 1]
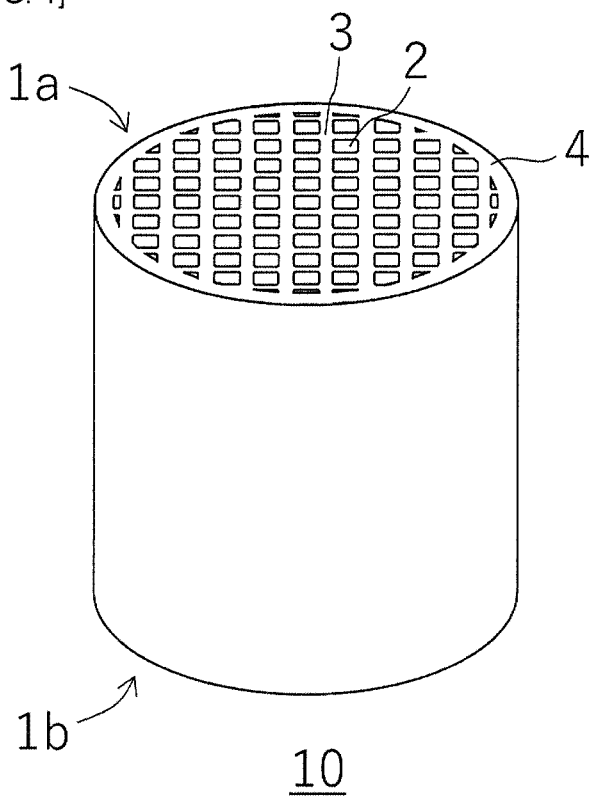
[FIG. 2]
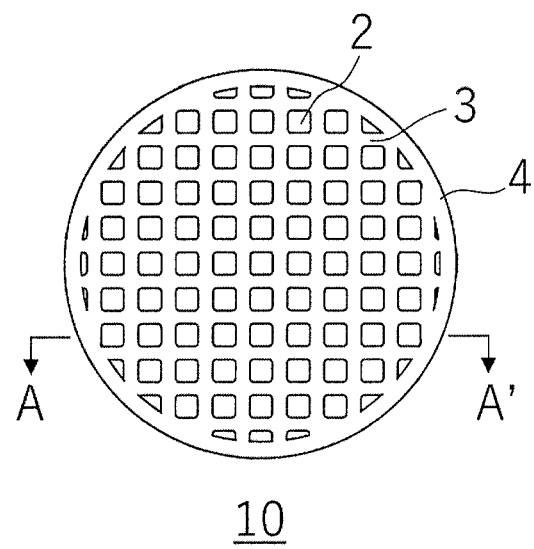

[FIG. 3]
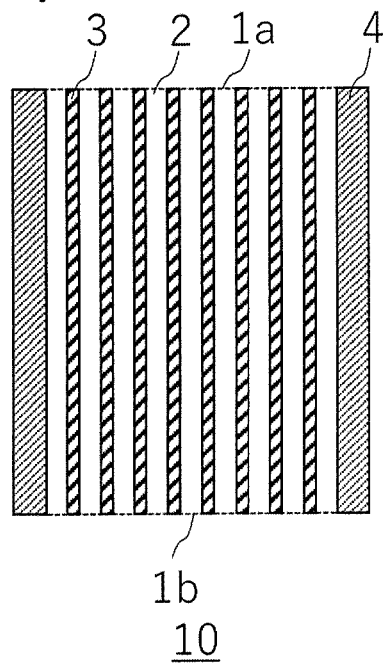
[FIG. 4]
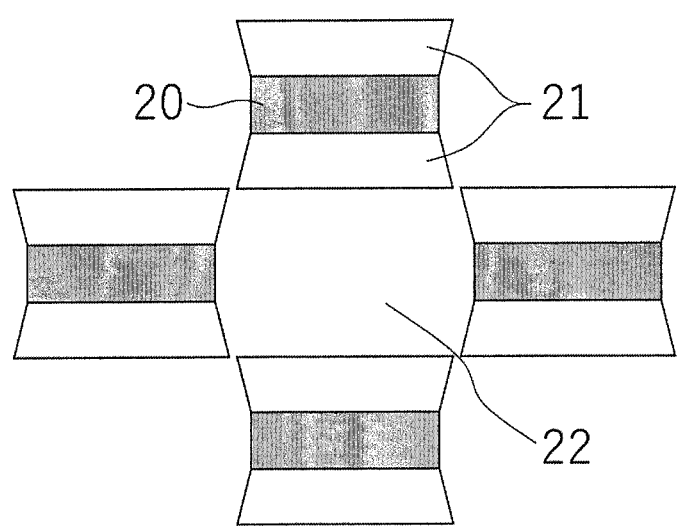

METHOD FOR PRODUCING HONEYCOMB STRUCTURE

TECHNICAL FIELD

The present invention relates to a method for producing a honeycomb structure.

BACKGROUND ART

A ceramic honeycomb structure has improved characteristics such as heat resistance and corrosion resistance, and has a structure including partition walls that define a plurality of cells extending from one end face serving as a fluid flow path to the other end face. Therefore, the ceramic honeycomb structure is used as a support for catalyst devices utilized for environmental measures, recovery of specific materials, and the like, and as a filter for purifying exhaust gases, in various fields such as chemistry, electric power, and steel industries, and the like.

As a method for producing such a honeycomb structure, for example, a method for producing a honeycomb structure is disclosed, which includes extruding a green body obtained by kneading a forming raw material containing a cordierite forming material, water, an organic binder and the like to produce a honeycomb formed body, and then drying and firing the honeycomb formed body (see, for example, Patent Document 1). In the producing method, the organic binder used for the forming raw material is a component that provides plasticity and shape retention to improve formability of the green body into the honeycomb formed body. Therefore, an increasing amount of the organic binder added improves the formability of the green body. In order to form a large honeycomb structure or a honeycomb structure having a complex cell structure which has increased the demand in recent years, a green body having better formability than in the case of producing a small or simple honeycomb structure is required. As a result, an increased amount of the organic binder may have to be blended into the forming raw material.

The organic binder in the honeycomb formed body gelates (i.e., separates water) when it is deprived of water during drying. By this gelation, the honeycomb formed body is cured so that its strength is improved.

However, the organic binder is burned out during firing, which causes a decrease in mechanical strength of a honeycomb structure. In particular, since spaces occupied by the organic binder tend to be defective, the mechanical strength of the honeycomb structure is deteriorated when an amount of the organic binder added is increased. Further, in the large honeycomb structure, the inside of the structure tends to have a higher temperature due to heat of combustion when the organic binder is burned out during firing. Therefore, thermal stress due to a temperature difference between the inside and outside of the honeycomb structure tends to generate defects such as cracks, thereby reducing the mechanical strength of the honeycomb structure as well as significantly decreasing a yield.

Furthermore, the combustion of the organic binder during firing generates $CO_2$ and harmful gases to be released to the atmosphere, which causes environmental problems such as air pollution and global warming.

To solve the above problems, prior art discloses a technique for producing a honeycomb structure which suppresses the generation of defects such as cracks to maintain high strength and low thermal expansion by blending an inorganic binder or a forming aid into a forming raw material (see, for example, Patent Documents 2 and 3). Prior art also discloses a technique for producing a honeycomb structure which has improved strength without containing large amounts of an organic binder and an inorganic binder, by applying a predetermined aqueous electrolyte solution to at least a part of a surface of a ceramic formed body (see, for example, Patent Documents 4 and 5).

CITATION LIST

Patent Literatures

Patent Document 1: Japanese Patent Application Publication No. 2002-292616 A1
Patent Document 2: Japanese Patent No. 4745963 B
Patent Document 3: Japanese Patent No. 5001892 B
Patent Document 4: Japanese Patent No. 5647051 B
Patent Document 5: Japanese Patent No. 5658067 B

SUMMARY OF INVENTION

Although the producing methods described in Patent Documents 2 and 3 provide an effect of suppressing the generation of defects such as cracks, they have problems that an effect of sufficiently suppress the generation of defects such as breakage due to the temperature difference or shrinkage difference between the surface and the inside of the honeycomb formed body in a temperature range during firing. In particular, the producing method disclosed in Patent Document 2 employs a forming material containing, in addition to the cordierite forming material and the organic binder, a dispersion obtained by previously dispersing smectite such as montmorillonite in water. When montmorillonite is added to the forming raw material, a thermal expansion coefficient of the honeycomb structure tends to increase, so that thermal shock resistance is decreased only by addition of montmorillonite. Further, in the producing method disclosed in Patent Document 3, the generation of defects such as breakage can be somewhat suppressed such as by decreasing a temperature rising rate during firing. However, such a method causes another problem that a production time and production cost of the honeycomb structure are increased.

Moreover, the producing methods disclosed in Patent Documents 4 and 5 include the step of applying the aqueous electrolyte solution containing predetermined cations to the surface of the honeycomb formed body, which causes a problem that the producing method is complicated.

The present invention has been made to solve the above problems. An object of the present invention is to provide a method for producing a honeycomb structure that can suppress generation of defects such as breakage due to a temperature difference or a shrinkage difference between a surface and the inside of a honeycomb formed body in a temperature range during firing and can have improved thermal shock resistance.

As a result of intensive studies focusing on an inorganic binder used in production of a honeycomb structure, the present inventors have found that a magnesium silicate mineral having a 2:1 ribbon type structure, which is generally used as a thickener, an adsorbent or the like, has properties suitable as the inorganic binder, and completed the present invention.

Thus, the present invention relates to a method for producing a honeycomb structure, the method comprising the steps of: kneading a forming raw material containing a cordierite forming material and then forming it to produce a honeycomb formed body; and firing the honeycomb formed body to provide a honeycomb structure, wherein from 0.1 to 6.0 parts by mass of a magnesium silicate mineral having a 2:1 ribbon type structure per 100 parts by mass of the cordierite forming material is added to the forming raw material.

According to the present invention, it is possible to provide a method for producing a honeycomb structure that can effectively suppress the generation of defects such as breakage due to a temperature difference or a shrinkage difference between a surface and the inside of a honeycomb formed body in a temperature range during firing, and can have improved thermal shock resistance.

BRIEF DESCRIPTION OF DRAWINGS

FIG. 1 is a perspective view schematically showing a honeycomb structure produced by a method for producing a honeycomb structure according to an embodiment of the present invention.

FIG. 2 is a schematic plan view of the honeycomb structure shown in FIG. 1 as viewed from a first end face side.

FIG. 3 is a schematic cross-sectional view showing the A-A' cross section of FIG. 2.

FIG. 4 is a schematic view for explaining a 2:1 ribbon type structure of a magnesium silicate mineral.

DESCRIPTION OF THE PREFERRED EMBODIMENTS

Hereinafter, preferred embodiments of a method for producing a honeycomb structure according to the present invention will be specifically described, but the present invention should not be construed as being limited thereto, and various modifications and improvements may be made based on the knowledge of a person skilled in the art, without departing from the spirit of the present invention. A plurality of elements disclosed in each embodiment can form various inventions by proper combinations. For example, some elements may be deleted from all the elements described in the embodiments, or elements of different embodiments may be optionally combined.

In one embodiment, a method for producing a honeycomb structure according to the present invention includes the steps of: kneading a forming raw material containing a cordierite forming material and then forming it to produce a honeycomb formed body; and firing the honeycomb formed body to provide a honeycomb structure. Here, the honeycomb structure produced by the method for producing the honeycomb structure according to the present embodiment will be described with reference to FIGS. 1 to 3. FIG. 1 is a perspective view schematically showing a honeycomb structure produced by a method for producing a honeycomb structure according to an embodiment of the present invention. FIG. 2 is a schematic plan view of the honeycomb structure shown in FIG. 1 as viewed from a first end face side. FIG. 3 is a schematic cross-sectional view showing the A-A' cross section of FIG. 2.

As shown in FIG. 1 to FIG. 3, a honeycomb structure 10 includes partition walls 3 that define a plurality of cells 2 penetrating from a first end face 1a to a second end face 1b to form fluid flow paths. Further, an outer peripheral wall 4 is formed on an outer peripheral surface of the honeycomb structure 10. The method for producing the honeycomb structure according to the present embodiment relates to a method for producing such a honeycomb structure 10.

Hereinafter, the method for producing the honeycomb structure 10 according to the present embodiment may be abbreviated as a producing method of the present embodiment.

In the producing method of the present embodiment, a forming raw material containing a cordierite forming material is firstly kneaded to obtain a green body, and the green body is then formed to produce a honeycomb formed body.

As used herein, the "cordierite forming material" means a material that will form cordierite after firing, and is a main component of the forming raw material. That is, the cordierite forming material will form cordierite that is a main component of the partition walls 3 and the outer peripheral wall 4 after firing of the honeycomb formed body. Examples of the cordierite forming material include, but not particularly limited to, oxides, hydroxides or carbonates containing at least one element selected from the group consisting of magnesium, aluminum and silicon. Examples of the cordierite forming materials include talc, kaolin, alumina, aluminum hydroxide, silica, magnesia and the like. These can be used alone or in combination of two or more.

The content of the cordierite forming material in the forming raw material is not particularly limited, and it may preferably be from 94.8 to 99.4% by mass. If the content of the cordierite forming material is less than 94.8% by mass, any problem may be caused in terms of thermal expansion and strength of the honeycomb structure. On the other hand, if the content of the cordierite forming material is more than 99.4% by mass, it may be difficult to be formed into a honeycomb shape. From the viewpoint of stably suppressing these problems, the content of the cordierite forming material in the forming raw material is more preferably from 95.5 to 99.2% by mass, and even more preferably from 96.1 to 99.0% by mass.

The forming raw material contains a magnesium silicate mineral having a 2:1 ribbon type structure as an inorganic binder.

As used herein, the "2:1 ribbon type structure" means a ribbon-like structure in which one unit is a sheet (T-O-T layer) having upper and lower sides of an octahedral layer 20 (O layer) sandwiched by two tetrahedral layers 21 (T layer), and a tunnel 22 is formed among four T-O-T layers. Further, the T layer of the T-O-T layer shares oxygen of the T-layer of the T-O-T layer located obliquely upward or obliquely downward, and water molecules are present in the tunnel 22. The octahedral layers 20 include those containing aluminum or magnesium and oxygen. The tetrahedral layers 21 include those containing silicon or aluminum and oxygen.

The magnesium silicate mineral having a 2:1 ribbon structure (which, hereinafter, may be abbreviated as a "magnesium silicate mineral") has the minute tunnel 22 and is thus porous, and it has a large specific surface area. Therefore, the magnesium silicate mineral has a characteristic of improved absorptivity. Moreover, the magnesium silicate mineral is generally used as a thickener and an adsorbent because it also has improved thixotropy and plasticity, and when it is used as an inorganic binder, formability can be improved.

Further, the magnesium silicate mineral is characterized by difficulty of swelling in a water-soluble system, which is different from clay minerals having a layered structure such as montmorillonite. Therefore, an occupied volume of the magnesium silicate mineral hardly changes before and after drying. Therefore, in the case where the magnesium silicate mineral is used as the inorganic binder, shrinkage during drying is decreased as compared with the case where the clay mineral having a layered structure such as montmorillonite is used as the inorganic binder, so that an amount of a pore former required for maintaining the porosity can be reduced.

Furthermore, the magnesium silicate mineral is generally fibrous, which is different from clay minerals having a layered structure such as montmorillonite. Therefore, when the magnesium silicate mineral is mixed and kneaded with the forming raw material, the magnesium silicate material is more easily entangled with the cordierite forming material than the clay minerals having a layered structure such as montmorillonite, and uniformly dispersed in the form of a network to bind the cordierite forming materials to each other. Therefore, when the magnesium silicate mineral is used as the inorganic binder, the formability into the honeycomb formed body can be improved as compared with the case where the clay mineral having a layered structure such as montmorillonite is used as the inorganic binder.

An amount of the magnesium silicate mineral to be added is from 0.1 to 6.0 parts by mass per 100 parts by mass of the cordierite forming material, in terms of obtaining the above effects. If the amount of the magnesium silicate mineral to be added is less than 0.1 parts by mass, the function as the inorganic binder cannot be sufficiently obtained, so that it is difficult to maintain the shape of the honeycomb formed body. Further, it is also considered that a larger amount of an organic binder is added to the forming raw material in order to maintain the shape of the honeycomb formed body, but in this case, an amount of $CO_2$ and harmful gases generated will be increased. On the other hand, if the amount of the magnesium silicate mineral to be added is more than 6.0 parts by mass, a thermal expansion coefficient of the honeycomb structure will be increased. The amount of the magnesium silicate mineral to be added is preferably 0.5 parts by mass or more, and more preferably 0.7 parts by mass or more, and even more preferably 1.0 parts by mass or more, in terms of stably obtaining the function as the inorganic binder. The amount of the magnesium silicate mineral to be added is preferably 5.5 parts by mass or less, and more preferably 5.0 parts by mass or less, and even more preferably 4.5 parts by mass or less, in terms of stably suppressing an increase in the thermal expansion coefficient of the honeycomb structure.

Examples of the magnesium silicate mineral having a 2:1 ribbon type structure include, but not limited to, sepiolite, attapulgite, and the like. These can be used alone or in combination of two or more. Among them, sepiolite is preferable in terms of the thermal expansion coefficient of the honeycomb structure.

In general, the magnesium silicate mineral having a 2:1 ribbon type structure is commercially available, but it may contain a large amount of impurities such as sodium, potassium, and calcium. If the magnesium silicate mineral having a large amount of such impurities is used, sodium, potassium, calcium and the like will be present as impurities in cordierite that will form the honeycomb structure, a final product. In particular, the contamination of sodium, potassium and calcium as impurities in cordierite that will form the honeycomb structure results in inhibition of low thermal expansion which is a feature of cordierite.

Therefore, the total amount of sodium, potassium and calcium contained in the magnesium silicate mineral is preferably 1.1% by mass or less as converted into an oxide, and more preferably 1.0% by mass or less, and even more preferably 0.95% by mass or less. If the total amount of sodium, potassium and calcium contained in the magnesium silicate mineral is more than 1.1% by mass as converted into an oxide, the thermal expansion coefficient of the honeycomb structure will be increased, so that any sufficient thermal shock resistance cannot be ensured in some cases.

The magnesium silicate mineral may not contain sodium, potassium and calcium. That is, the total amount of sodium, potassium and calcium contained in the magnesium silicate mineral may be equal to or less than a detection limit of a measuring device. The detection limit of the measuring device can be 0.01% by mass. A ratio of sodium, potassium and calcium contained in the magnesium silicate mineral can be measured and calculated according to JIS R 2216 "Method of X-ray Fluorescence Analysis of Refractory Products".

A method of decreasing the total amount of sodium, potassium, and calcium in the magnesium silicate mineral is not particularly limited, and can be carried out according to a well-known method. Further, since magnesium silicate minerals having a lower total amount of sodium, potassium and calcium are also commercially available, such magnesium silicate minerals may be selected and used.

A method of adding the magnesium silicate mineral having a 2:1 ribbon type structure in the producing method of the present embodiment is not particularly limited, and may be carried out by adding the magnesium silicate mineral as it is to the forming raw material, or by adding to the forming raw material the magnesium silicate mineral in the form of a dispersion obtained by previously dispersing it in water. Among them, the addition of the magnesium silicate mineral in the form of the dispersion obtained by previously dispersing it in water is preferable, because even if a small amount of the dispersion, plasticity and formability can be effectively provided to the green body. In particular, the magnesium silicate mineral is in the form of fibers, so that the state of the dispersion allows the fibers dispersed in water to be entangled with each other to result in high viscosity. The addition to the forming raw material in this state can allow development of sufficient plasticity and formability of the green body even if the amount of the magnesium silicate mineral is substantially miner. Moreover, the dispersion is difficult to precipitate the magnesium silicate mineral and can maintain the state of being dispersed in water for a long period of time, so that it can allow the magnesium silicate mineral to be uniformly dispersed in the green body.

The forming raw material contains the above cordierite forming material and magnesium silicate mineral having a 2:1 ribbon type structure as essential components, but it may contain further components other than those components. The further components include organic binders, inorganic binders other than the magnesium silicate mineral having a 2:1 ribbon structure, pore formers, dispersing agents, water as a dispersion medium, and the like.

The organic binder is a component which improves the plasticity and formability of the green body obtained by kneading the forming raw material, and which also functions as a shape retaining agent for maintaining the shape of the formed body. However, the organic binder will be a source of $CO_2$ and harmful gases during firing. Therefore, when the honeycomb formed body containing a large amount of the organic binder is fired to produce a honeycomb structure, environmental pollution and global warming may be promoted. Further, spaces in which the organic binder was occupied may bring about defects during firing. As a result, defects such as cracks may be generated in the honeycomb structure, or the strength of the honeycomb structure may be reduced. From such a point of view, the amount of the organic binder added to the forming raw material should be minimized. In the producing method of the present embodiment, the magnesium silicate mineral having a 2:1 ribbon structure is used as the inorganic binder, so that the amount of the organic binder added can be relatively decreased. When adding the organic binder, the amount of the organic binder to be added is 5 parts by mass or less, preferably 4 parts by mass, relative to the total 100 parts by mass of the cordierite forming material and the inorganic binder (including the magnesium silicate mineral having a 2:1 ribbon type structure). Further, depending on applications and the like, the forming raw material may not contain any organic binder. That is, the lower limit of the amount of the organic binder to be added may be 0 parts by mass.

Non-limiting examples of the organic binder include organic polymers. Examples of organic polymers include hydroxypropoxyl methylcellulose, hydroxypropyl methylcellulose, methylcellulose, hydroxyethylcellulose, carboxymethylcellulose, polyvinyl alcohol and the like. These can be used alone or in combination of two or more.

The inorganic binder other than the magnesium silicate mineral having a 2:1 ribbon type structure is a component which improves the plasticity and formability of the green body obtained by kneading the forming raw material, and which also functions as a shape retaining agent for maintaining the shape of the formed body, as with the organic binder. However, if a large amount of the inorganic binder is contained, the thermal shock resistance of the honeycomb structure may be decreased. Therefore, an amount of the inorganic binder other than the magnesium silicate mineral having a 2:1 ribbon structure, to be added to the forming raw material, should be minimized. In the producing method of the present embodiment, the amount of the inorganic binder to be added, other than the magnesium silicate mineral having a 2:1 ribbon structure, is preferably 3 parts by mass or less, more preferably 2 parts by mass or less, per 100 parts by mass of the cordierite forming material. Of course, the inorganic binder other than magnesium silicate mineral having a 2:1 ribbon type structure may not be contained in the forming raw material. That is, the lower limit of the amount of the inorganic binder to be added may be 0 parts by mass.

Non-limiting examples of the inorganic binder other than the magnesium silicate mineral having a 2:1 ribbon type structure include smectite such as montmorillonite, hectorite, saponite and the like. These can be used alone or in combination of two or more. In addition, it is possible to use smectite in which at least a part of intercalated metal cations is ion-exchanged with a non-metal cation (for example, an ammonium ion).

The pore former is a component that is for templates of pores and will form pores having a desired shape, size and distribution in the honeycomb structure. Therefore, the addition of the pore former can increase the porosity and provide a high porosity honeycomb structure.

Non-limiting examples of the pore former include graphite, wheat flour, starch, phenol resins, poly(methyl methacrylate), polyethylene, polyethylene terephthalate, and foaming resins such as acrylonitrile-based plastic balloons. These can be used alone or in combination of two or more. These burn themselves out, rather than form pores. Among these, the foaming resins are preferable, in terms of suppressing the generation of $CO_2$ and harmful gases and the generation of cracks.

When the pore former is used, an amount of the pore former to be added is preferably 5 parts by mass or less, more preferably 4 parts by mass or less, per 100 parts by mass of the cordierite forming material and the inorganic binder (including the magnesium silicate mineral having a 2:1 ribbon type structure). Further, depending on applications and the like, the forming raw material may not contain the pore former. That is, the lower limit of the amount of the pore former to be added may be 0 parts by mass.

The dispersing agent is a component for uniformly dispersing the components in the forming raw material. Non-limiting examples of the dispersing agent that can be used include surfactants. Non-limiting examples of the surfactants include those known in the art.

Further, the amount of the dispersing agent to be added is not particularly limited as long as it is in the range that does not inhibit the effect of the present invention.

Although an amount of water as a dispersion medium to be added is not particularly limited, the amount of water to be added is preferably adjusted such that the green body during forming has appropriate hardness.

A method of kneading the forming raw material containing the above components to obtain the green body is not particularly limited, and it can be carried out according to a well-known method. Example of the method includes a method of using a kneader, a vacuum green body kneader, and the like.

The green body obtained by kneading the forming raw material allows production of a honeycomb formed body by forming the green body into a honeycomb shape. The resulting honeycomb formed body may be dried to form a honeycomb dried body.

Examples of the shape of the honeycomb formed body includes, but not particularly limited to, those in which honeycomb-shaped partition walls define a plurality of cells that extend from the first end surface, one end surface, to the second end surface, the other end surface. When the honeycomb structure is used for a filter application such as DPF, one end of the cells is plugged by plugged portions. It should be noted that the DPF is an abbreviation of "Diesel Particulate Filter".

Further, non-limiting examples of the entire shape of the honeycomb formed body include a circular pillar shape, a quadrangular pillar shape, and a triangular pillar shape. Furthermore, non-limiting examples of the cell shape of the honeycomb formed body include a square, a hexagon, and a triangle. The cell shape is a shape of each cell in a cross section orthogonal to a cell extending direction of the honeycomb structure.

The honeycomb shape may be formed by conventionally well-known forming method such as extrusion molding, injection molding, press molding and the like, although not limited thereto. Among them, a preferable example includes a method of extruding the green body using a die having a desired cell shape, partition wall thickness and cell density.

The drying method is also not particularly limited, and for example, conventionally known drying methods may be used, including hot air drying, microwave drying, dielectric drying, reduced pressure drying, vacuum drying, freeze drying and the like. Among them, it is preferable to use a drying method combining the hot air drying and the microwave drying or the dielectric drying, because it can rapidly and uniformly dry the entire honeycomb formed body.

Then, in the producing method of the present embodiment, the honeycomb formed body is fired to obtain a honeycomb structure.

As used herein, "fired" or "firing" is a concept including both calcination and main calcination, but when no calcination is performed, it means only main calcination. When the calcination is performed, the honeycomb formed body obtained as described above can be calcined to obtain a honeycomb calcined body. The term "calcined" or "calcination" refers to an operation of burning out and removing organic matters in the honeycomb formed body, and may be referred to as "degreased" or "degreasing". Examples of the organic matters in the honeycomb formed body include the organic binder, the dispersing agent, the pore former and the like. In general, the burning temperature of the organic binder is from about 100 to 300° C., and the burning temperature of the pore former is from about 200 to 800° C. Therefore, the calcination temperature may be from about 200 to 1000° C. The calcination time is not particularly limited, but it is generally from about 1 to 10 hours.

The honeycomb calcined body or the honeycomb formed body (in the case where calcination is not performed) obtained as described above can be then subjected to the main calcination to obtain a honeycomb structure. The term "main calcination" means an operation for sintering and densifying the raw material in the honeycomb calcined body or the honeycomb formed body to ensure a predetermined strength. Since the main calcination conditions such as the firing temperature and the firing time vary depending on the type of the forming raw material, appropriate conditions may be selected according to the type. In the producing method of the present embodiment, the honeycomb calcined body or the honeycomb formed body is preferably fired at a temperature of from 1300 to 1500° C., and more preferably from 1350 to 1450° C. If the firing temperature is less than 1300° C., any intended crystal phase (cordierite) may not be obtained. On the other hand, if the firing temperature is more than 1500° C., it may be melted.

The honeycomb structure produced by the producing method of the present embodiment is a high quality cordierite-based structure having high strength and low thermal expansion, with less defects and cracks. Examples of a suitable composition of cordierite includes, for example, $2MgO.2Al_2O_3.5SiO_2$.

EXAMPLES

Hereinafter, the present invention will be more specifically described by Examples, but the present invention is not limited by these examples.

Example 1

First, talc, kaolin, alumina, aluminum hydroxide and silica were prepared as cordierite forming materials. The amounts of talc, kaolin, alumina, aluminum hydroxide and silica were appropriately adjusted to be close to the cordierite composition. The cordierite forming material containing these components was mixed with the magnesium silicate mineral having a 2:1 ribbon type structure, and the organic binder, the surfactant and water were then added and mixed to obtain a green body.

Methylcellulose was used as the organic binder, and sepiolite A (a commercially available product) was used as the magnesium silicate mineral having a 2:1 ribbon type structure. The amount of the magnesium silicate mineral having a 2:1 ribbon type structure to be added was 1.0 part by mass per 100 parts by mass of the cordierite forming material, and the amount of the organic binder to be added was 5 parts by mass per the total 100 parts by mass of the cordierite forming material and the magnesium silicate mineral having a 2:1 ribbon type structure, and the amount of the surfactant to be added was 1 part by mass per the total 100 parts by mass of the cordierite forming material and the magnesium silicate mineral having a 2:1 ribbon type structure, and the amount of water to be added was 30 parts by mass per the total 100 parts by mass of the cordierite forming material and the magnesium silicate mineral having a 2:1 ribbon type structure.

In addition, for the magnesium silicate mineral having a 2:1 ribbon type structure used, the chemical composition (especially a mass ratio of $Na_2O$, $K_2O$, and $CaO$) was measured using multiple element simultaneous measurement type fluorescence X ray analyzer (the same applied to Examples as described below). As the analyzer, "PW 2606/10 (trade name)" from PHILIPS was used.

The resulting green body was formed into a honeycomb shape by an extruder to provide a honeycomb formed body. Upon the forming, satisfactory forming could be carried out without clogging of the die of the extruder or forming defects.

The resulting honeycomb formed body was then dried by a microwave and a hot air, and then fired in a temperature atmosphere of 1420° C. for 7 hours to provide a honeycomb structure.

Example 2

A honeycomb structure was obtained by the same method as that of Example 1, with the exception that the amount of the magnesium silicate mineral having a 2:1 ribbon type structure (sepiolite A) to be added was changed to 2.0 parts by mass per 100 parts by mass of the cordierite forming material.

Example 3

A honeycomb structure was obtained by the same method as that of Example 1, with the exception that the amount of the magnesium silicate mineral having a 2:1 ribbon type structure (sepiolite A) to be added was changed to 4.0 parts by mass per 100 parts by mass of the cordierite forming material.

Example 4

A honeycomb structure was obtained by the same method as that of Example 1, with the exception that the amount of the magnesium silicate mineral having a 2:1 ribbon type structure (sepiolite A) to be added was changed to 6.0 parts by mass per 100 parts by mass of the cordierite forming material.

Example 5

A honeycomb structure was obtained by the same method as that of Example 1, with the exception that sepiolite B (a commercially available product) was used as the magnesium silicate mineral having a 2:1 ribbon type structure and the amount of it to be added was changed to 2.0 parts by mass per 100 parts by mass of the cordierite forming material.

Example 6

A honeycomb structure was obtained by the same method as that of Example 1, with the exception that attapulgite (a commercially available product) was used as the magnesium silicate mineral having a 2:1 ribbon type structure and the amount of it to be added was changed to 2.0 parts by mass per 100 parts by mass of the cordierite forming material.

Comparative Example 1

A honeycomb structure was obtained by the same method as that of Example 1, with the exception that the magnesium silicate mineral having a 2:1 ribbon type structure was not added, and the amount of the organic binder to be added was changed to 5 parts by mass per 100 parts by mass of the cordierite forming material.

Comparative Example 2

A honeycomb structure was obtained by the same method as that of Example 1, with the exception that the amount of the magnesium silicate mineral having a 2:1 ribbon type structure (sepiolite A) to be added was changed to 8.0 parts by mass per 100 parts by mass of the cordierite forming material.

The following evaluation was performed for the honeycomb structures obtained by Examples and Comparative Examples as described above.
(Breakage Defects During Firing)

Ten honeycomb structures according to Examples and Comparative Examples as described above were produced, and the presence or absence of breakage defects at the end faces of the honeycomb structures was visually confirmed. In the evaluation results, "0/10" indicates that among the ten honeycomb structures, the number of honeycomb structures in which breakage defects were generated was zero. Further, "10/10" indicates that among the ten honeycomb structures, the number of honeycomb structures in which breakage defects were generated was 10.
(Thermal Expansion Coefficient)

The thermal expansion coefficient of each honeycomb structure was measured using "Thermo plus TG 8120 (trade name)" from Rigaku Corporation. In the evaluation of the thermal expansion coefficient, $0.7 \times 10^{-6}/°C$ or less was determined to be passing as a level sufficient to ensure the thermal shock resistance of the honeycomb structure.

The above evaluation results are shown in Table 1.

magnesium silicate mineral having a 2:1 ribbon type structure per 100 parts by mass of the cordierite forming material, no breakage defect during firing was confirmed for all of the ten honeycomb structures, but the thermal expansion coefficient was higher.

As can be seen from the above results, according to the present invention, it is possible to provide a method for producing a honeycomb structure that can effectively suppress the generation of defects such as breakage due to the temperature difference or shrinkage difference between the surface and the inside of the honeycomb formed body in the temperature range during firing and have improved impact resistance.

INDUSTRIAL APPLICABILITY

The present invention is used in various separation/purification devices suitable as a countermeasure for preventing environmental pollution, global warming and the like in various fields such as chemistry, power, steel, and industrial waste disposal.

DESCRIPTION OF REFERENCE NUMERALS 1a first end face
1b second end face
2 cell
3 partition wall
4 outer peripheral wall
10 honeycomb structure
20 octahedral layer
21 tetrahedral layer
22 tunnel

TABLE 1

| | Magnesium Silicate Mineral having 2:1 Ribbon Type Structure | | | | | |
|---|---|---|---|---|---|---|
| | Type | $Na_2O$ (% by mass) | $K_2O$ (% by mass) | CaO (% by mass) | Amont Added (parts by mass) | Thermal Expansion Coefficient ($\times 10^{-6}/°C$) | Breakage Defects during Firing |
| Example 1 | Sepiolite A | 0.08 | 0.61 | 0.22 | 1 | 0.41 | 0/10 |
| Example 2 | Sepiolite A | 0.08 | 0.61 | 0.22 | 2 | 0.47 | 0/10 |
| Example 3 | Sepiolite A | 0.08 | 0.61 | 0.22 | 4 | 0.54 | 0/10 |
| Example 4 | Sepiolite A | 0.08 | 0.61 | 0.22 | 6 | 0.59 | 0/10 |
| Example 5 | Sepiolite B | 0.13 | 1.02 | 1.17 | 2 | 0.65 | 0/10 |
| Example 6 | Attapulgite | 0.59 | 0.94 | 5.01 | 2 | 0.64 | 0/10 |
| Comparative Example 1 | — | — | — | — | — | 0.41 | 10/10 |
| Comparative Example 2 | Sepiolite A | 0.08 | 0.61 | 0.22 | 8 | 0.73 | 0/10 |

As shown in Table 1, in Examples 1 to 6 using the forming raw material containing from 0.1 to 6.0 parts by mass of the magnesium silicate mineral having a 2:1 ribbon structure per 100 parts by mass of the cordierite forming material, no breakage defect during firing was confirmed for all of the ten honeycomb structures. In addition, each of the honeycomb structures according to Examples 1 to 6 had a lower thermal expansion coefficient, which was practicable.

However, in Comparative Example 1 using the forming raw material that did not contain the magnesium silicate mineral having a 2:1 ribbon type structure, breakage defects during firing were confirmed for all of the ten honeycomb structures. Further, in Comparative Example 2 using the forming raw material containing 8.0 parts by mass of the

What is claimed is:

1. A method for producing a honeycomb structure, the method comprising the steps of:
    kneading a forming raw material containing a cordierite forming material and then forming it to produce a honeycomb formed body; and
    firing the honeycomb formed body to provide a honeycomb structure,
    wherein from 0.1 to 6.0 parts by mass of a magnesium silicate mineral having a 2:1 ribbon structure per 100 parts by mass of the cordierite forming material is added to the forming raw material,
    wherein a total amount of sodium, potassium and calcium contained in the magnesium silicate mineral is 1.1% by mass or less as converted into oxide.

2. The method for producing the honeycomb structure according to claim 1, wherein the magnesium silicate mineral is fibrous.

3. The method for producing the honeycomb structure according to claim 1, wherein the magnesium silicate mineral is sepiolite.

* * * * *